US011153148B2

(12) United States Patent
Zhang et al.

(10) Patent No.: US 11,153,148 B2
(45) Date of Patent: *Oct. 19, 2021

(54) RESOURCE STATE MONITORING METHOD, DEVICE AND COMMUNICATION NETWORK

(71) Applicant: HUAWEI TECHNOLOGIES CO., LTD., Guangdong (CN)

(72) Inventors: Fatai Zhang, Dongguan (CN); Jianhua Gao, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/390,009

(22) Filed: Apr. 22, 2019

(65) Prior Publication Data

US 2019/0245733 A1    Aug. 8, 2019

Related U.S. Application Data

(60) Division of application No. 13/198,937, filed on Aug. 5, 2011, now Pat. No. 10,298,438, which is a
(Continued)

(30) Foreign Application Priority Data

May 9, 2007  (CN) .......................... 200710104352.1

(51) Int. Cl.
 *H04L 12/24*   (2006.01)
 *H04L 12/26*   (2006.01)
 *H04L 12/70*   (2013.01)

(52) U.S. Cl.
 CPC .......... *H04L 41/06* (2013.01); *H04L 43/0817* (2013.01); *H04L 2012/5625* (2013.01)

(58) Field of Classification Search
 CPC ... H04W 72/042; H04W 72/043; H04J 11/00; H04L 5/0044; H04L 5/0053;
(Continued)

(56) References Cited

U.S. PATENT DOCUMENTS 6,785,843 B1    8/2004  McRae et al.
7,293,080 B1 *  11/2007 Clemm .................. H04L 47/10
                                       709/223
(Continued)

FOREIGN PATENT DOCUMENTS

CN    1764320 A    4/2006
CN    1764323 A    4/2006
(Continued)

OTHER PUBLICATIONS

ITU-T G.7716/Y.1707,"Architecture of control plane operations", International Telecommunication Union,Jan. 2010, total 34 pages.
(Continued)

*Primary Examiner* — Walter J Divito
*Assistant Examiner* — Anthony Luo
(74) *Attorney, Agent, or Firm* — Paul Christopher Hashim

(57) ABSTRACT

The application provides a method for monitoring resource state in a communication network that includes a plurality of nodes. A node in the communication network determines whether a label switching path connection, which connects the node with an adjacent node, is established successfully. Based on a determination that the label switching path connection is not established successfully, the node determines whether a data plane resource state of the node and a control plane resource state of the node are consistent. Based on a determination that the data plane resource state of the node and the control plane resource state of the node are inconsistent, the node reports the inconsistency to a management plane of the node.

20 Claims, 6 Drawing Sheets

Related U.S. Application Data continuation of application No. 12/421,074, filed on Apr. 9, 2009, now Pat. No. 8,014,300, which is a continuation of application No. PCT/CN2008/070885, filed on May 6, 2008.

(58) Field of Classification Search
CPC ... H04L 5/0094; H04L 27/2602; H04L 41/06; H04L 43/0817; H04L 2012/5625
See application file for complete search history.

(56) References Cited

U.S. PATENT DOCUMENTS

| | | |
|---|---|---|
| 7,317,731 B2 | 1/2008 | Seddigh et al. |
| 7,336,615 B1 | 2/2008 | Pan et al. |
| 7,447,225 B2 * | 11/2008 | Windisch ............ H04L 12/1877 370/428 |
| 7,680,934 B2 | 3/2010 | Aubin et al. |
| 7,881,183 B2 | 2/2011 | Wu et al. |
| 8,068,483 B2 | 11/2011 | Xu |
| 2004/0076151 A1* | 4/2004 | Fant ...................... H04L 45/505 370/389 |
| 2004/0193729 A1 | 9/2004 | Saraph |
| 2005/0002333 A1* | 1/2005 | Aalders .................. H04L 47/24 370/230 |
| 2005/0018602 A1 | 1/2005 | Labovitz et al. |
| 2006/0002370 A1 | 1/2006 | Rabie et al. |
| 2006/0002705 A1 | 1/2006 | Cline et al. |
| 2006/0133266 A1* | 6/2006 | Kim ........................ H04L 45/22 370/228 |
| 2007/0098008 A1 | 5/2007 | Sun et al. |
| 2008/0310430 A1 | 12/2008 | He |

FOREIGN PATENT DOCUMENTS

| | | |
|---|---|---|
| CN | 1859273 A | 11/2006 |
| CN | 101304340 B | 11/2008 |
| CN | 101453387 A | 6/2009 |

OTHER PUBLICATIONS

Lang, "RFC 4204—Link Management Protocol (LMP)," Network Working Group, Oct. 2005, The Internet Society, Reston, Virginia.

* cited by examiner

RESOURCE STATE MONITORING METHOD, DEVICE AND COMMUNICATION NETWORK

CROSS-REFERENCE TO RELATED APPLICATIONS

This application is a divisional application of U.S. patent application Ser. No. 13/198,937, filed on Aug. 5, 2011, which is a continuation of U.S. patent application Ser. No. 12/421,074, filed on Apr. 9, 2009, now U.S. Pat. No. 8,014,300. The U.S. patent application Ser. No. 12/421,074 is a continuation of International Patent Application No. PCT/CN2008/070885, filed on May 6, 2008. The International Patent Application claims priority to Chinese Patent Application No. 200710104352.1, filed on May 9, 2007. This application is also related to U.S. patent application Ser. No. 13/198,903, now U.S. Pat. No. 8,761,024, which is a divisional application of U.S. patent application Ser. No. 12/421,074. All of the afore-mentioned patent applications are hereby incorporated by reference in their entireties.

FIELD OF THE INVENTION

The present invention relates to the communication field, and particularly to a resource state monitoring method, device and communication network.

BACKGROUND

A conventional optical network mainly adopts a self-healing ring networking mode and has low bandwidth utilization. Furthermore, the conventional optical network is configured statically by a network administrator, and mainly adopts a ring networking, which has a complicated configuration and low bandwidth utilization, and is time consuming. With a requirement for multi-service, high bandwidth, high survivability and rapid connection provision, a network topology would evolve to be mainly a mesh network from being mainly a conventional ring network in the existing systems, and a network connection provision manner should transit to a signaling-based soft permanent connection and switched connection from a statically assigned permanent connection. A novel optical transfer network is referred to be an Automatically Switched Optical Network (ASON) or Generalized Multi-Protocol Label Switching (GMPLS) network.

As for network resources, the ASON/GMPLS must experience the following three processes before providing an available resource and forming a consistent global topology:

1. A vertical synchronization (or local initialization): a local resource of a control plane is initialized, in other words, the control plane acquires a view of the local resource on the control plane, for example, connection points (CPs) of a data plane are mapped to subnetwork points (SNPs) of the control plane, and obtain a resource pool of a local subnetwork point pool (SNPP).

2. A horizontal synchronization (or link discovery): adjacent SNPP links, or referred to as traffic engineering (TE) links, are acquired and formed through a discovery mechanism.

3. A global synchronization: each node obtains a global consistent topology through a route flooding, e.g., an open shortest path first protocol-transport engineering (OSPF-TE).

In the existing systems, the ASON/GMPLS would carry out the above three synchronization processes before providing the available resource and forming the consistent global topology, but in a network running process, some inconsistency may occur between the control plane resource state and the data plane resource state due to a network abnormality or other operations. Moreover, there is no mechanism for detecting the control plane resource state and the data plane resource state in the network running process in the existing systems. Therefore, once an inconsistency occurs, the network would fail, thereby influencing the network stability.

SUMMARY

The present invention is directed to a resource state monitoring method, device and communication network, so as to increase network stability.

Accordingly, an embodiment of the present invention provides a resource state monitoring method. In a network running process, the method includes: network event state information of a node is acquired, a data plane resource state of the node and a control plane resource state of the node are detected when the network event state information of the node meets a resource state detection triggering condition, and a detection result is reported to a management plane of the node.

An embodiment of the present invention further provides a resource state monitoring device, which includes: an acquiring unit, adapted to acquire network event state information of a node, a checking unit, adapted to judge whether the network event state information of the node meets a resource state detection triggering condition or not and send a triggering notification if the network event state information of the node meets a resource state detection triggering condition, a triggering unit, adapted to trigger detection after receiving the triggering notification of the checking unit, a detecting unit, adapted to detect a data plane resource state of the node and a control plane resource state of the node after receiving the triggering detection of the triggering unit, and a reporting unit, adapted to report a detection result of the detecting unit to a management plane of the node.

An embodiment of the present invention further provides a communication network, which includes several nodes, each of the nodes is adapted to communicate in a communication network, a communication control device adapted to control each of the nodes to communicate, and a resource state monitoring device adapted to acquire network event state information of each of the nodes, detect a data plane resource state of each of the nodes and a control plane resource state of each of the nodes when the network event state information of the nodes meets a resource state detection triggering condition, and report a detection result to a management plane of each of the nodes.

It can be seen from the above technical solution that, the embodiments of the present invention have the following beneficial effects.

In the embodiments of the present invention, during the network running process, the network event state information of the node is acquired, whether the network event state information of the node meets the resource state detection triggering condition or not is determined, and a consistency of the control plane resource state of the node and the data plane resource state of the node is detected if the network event state information of the node meets the resource state detection triggering condition. Therefore, inconsistency of the control plane resource state of the node and the data plane resource state of the node may be found out in time in the network running process, thereby increasing the network running stability.

DETAILED DESCRIPTION

The embodiments of the present invention provide a resource state monitoring method, device and a communication network so as to increase the network stability.

Following embodiments are described by taking an ASON network as an example. It may be understood that, the present invention may also be described based on other similar networks, such as a GMPLS network, and a processing flow thereof is similar.

Figure 1:
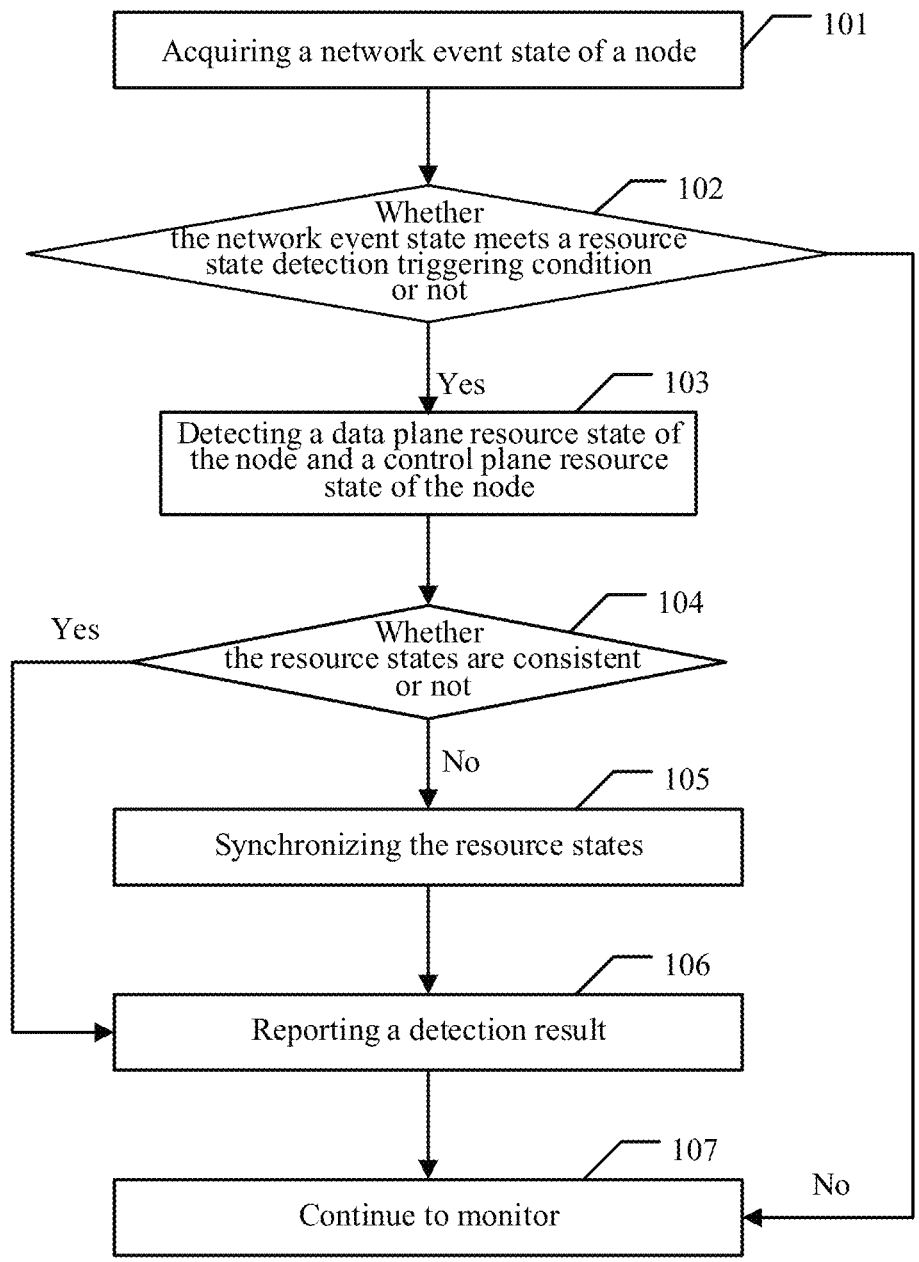
FIG. 1 is an overall flowchart of a resource state monitoring method according to an embodiment of the present invention.

Referring to FIG. 1, an overall flow of a resource state monitoring method according to an embodiment of the present invention includes the following steps:

Step 101: A network event state of a node is acquired.

Step 102: Whether the network event state of the node meets a resource state detection triggering condition or not is judged. Step 103 is carried out if the network event state of the node meets the resource state detection triggering condition; and step 107 is carried out if the network event state of the node does not meet the resource state detection triggering condition.

The situations included in a specific network event state will be described in the later embodiments.

The resource state detection triggering condition has three situations, which will be described in detail in later embodiments.

Step 103: A data plane resource state of the node and a control plane resource state of the node are detected.

Step 104: Whether the data plane resource state of the node and the control plane resource state of the node are consistent or not is judged. Step 106 is carried out if the data plane resource state of the node and the control plane resource state of the node are consistent; and step 105 is carried out if the data plane resource state of the node and the control plane resource state of the node are not consistent.

Step 105: The data plane resource state of the node and the control plane resource state of the node are synchronized.

Figure 7:
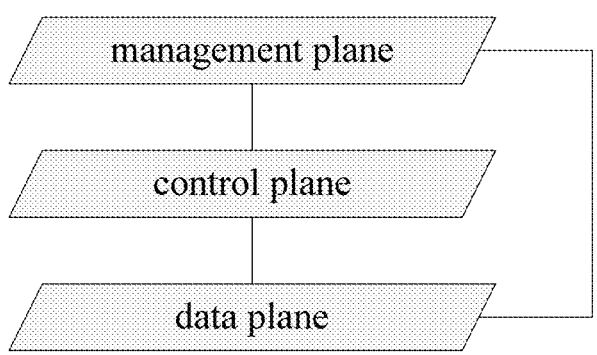
FIG. 7 is a schematic view of the data plane, control plane and management plane.

Step 106: A detection result of the data plane resource state of the node and the control plane resource state of the node is reported to a management plane of the node (See FIG. 7).

Step 107: The network event state of the node continues to be monitored.

In the above embodiment, during the ASON network running process, the network event state of the node is acquired, whether the state meets the resource state detection triggering condition is judged, and consistency detection is performed on the data plane resource state of the node and the control plane resource state of the node if it is determined that the state meets the resource state detection triggering condition. Thus, an instability factor existing in the ASON network running process may be found out in time, thereby increasing the network stability.

The resource states of the node in the embodiments of the present invention will first be illustrated in detail below.

The resource states of the node are mainly divided into a control plane resource state and a data plane resource state, and the control plane SNP state may be divided into available, potentially available, assigned and busy. The "available" state refers to that the resource corresponding to the SNP is in an idle state and can be used. The "potentially available" state and "busy" state are generally the states occur in a multi-adaptable or virtual private network (VPN), in which a connection point (CP) of one transfer plane resource may be assigned to multiple subnetwork points of multiple control planes to use. The "potentially available" state refers to that the resource corresponding to the transfer plane has not been assigned to any control plane or management plane to use, and these control planes potentially have a chance for using it. The "busy" state refers to that the resource corresponding to the transfer plane has been assigned to one of the control planes or management planes, and the SNP state of the other control planes is the busy state, i.e., the resource cannot be used again. The "assigned" state generally refers to that the resource corresponding to the SNP has been assigned, but the resource may also be assigned to a service with a higher priority or another specified service.

To simplify the description, in following description of each embodiment, the "available" and "potentially available" states are considered as an "available" state, and the "assigned" and "busy" states are considered as an "occupied" state. Therefore, the inconsistency of the control plane resource state and the data plane resource state may be divided into two cases, that is, "the control plane state is available, and the data plane state is occupied", and "the control plane state is occupied, and the data plane state is available."

In the overall flow of the above resource state monitoring method, when the network event state of the node meets the resource state detection triggering condition, the data plane resource state of the node and the control plane resource state of the node are detected. Three embodiments are taken as examples for the resource state detection triggering condition below, but the present invention is not limited thereto.

I. A Label Switching Path (LSP) Establishment Fails.

Figure 2:
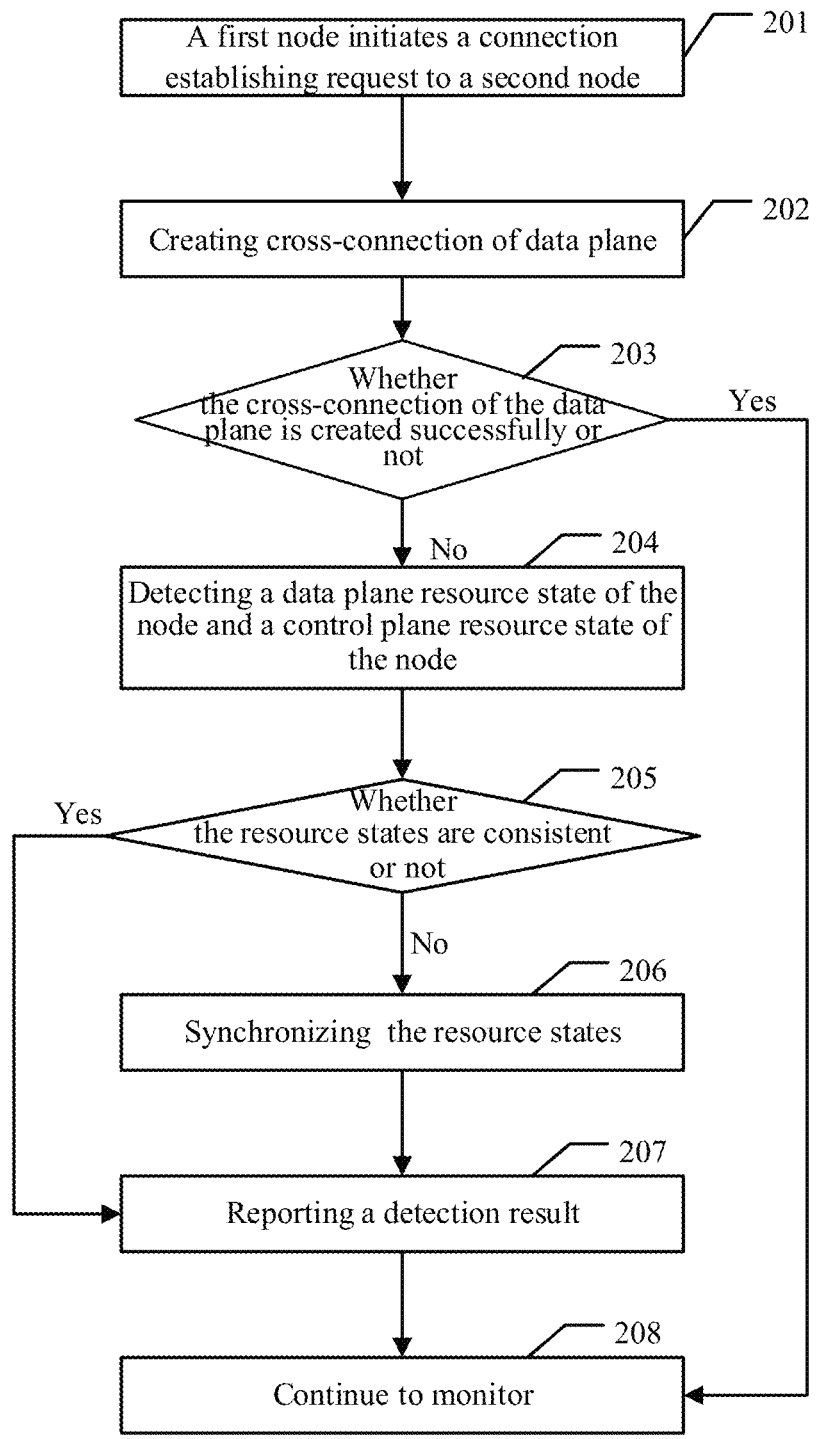
FIG. 2 is a flowchart of a resource state monitoring method according to a first embodiment of the present invention.

Referring to FIG. 2, a resource state monitoring method according to a first embodiment of the present invention is shown. In this embodiment, a first node and a second node may be considered as the present node and an adjacent node thereof. The method includes.

Step 201: The first node initiates a connection establishing request to the second node.

When the first node needs to communicate with the second node, the first node sends an LSP connection establishing request to the second node.

Step 202: A cross-connection of a data plane is created (See FIG. 7).

The first node and the second node respectively create the cross connection of the data plane inside the node, so as to establish the LSP connection.

Step 203: Whether the cross-connection of the data plane is created successfully or not is judged. Step 208 is carried out if the cross-connection of the data plane is created successfully, and step 204 is carried out if the cross-connection of the data plane is not created successfully.

The creation of the cross-connection of the data plane in this embodiment is a part of a process for establishing the LSP connection, so in general, the establishment of the LSP connection fails accordingly if the creation of the cross-connection of the data plane fails.

Step 204: The data plane resource state of the node and the control plane resource state of the node are detected.

In this embodiment, when the establishment of the LSP connection fails, the data plane resource states of the first node and the second node and the control plane resource states of the first node and the second node should be detected.

In this embodiment, the specific detecting process includes that the node requires a Link Resource Manager (LRM) to detect the resource state, and the LRM, in cooperation with another control plane entity, e.g., a Termination and Adaptation Performer (TAP), checks a data plane resource, detects the cross state of the data plane and the connection state of the control plane (See FIG. 7), and compares to see whether the resource corresponding to the node is consistent in the control plane and the data plane or not.

Step 205: Whether the data plane resource state of the node and the control plane resource state of the node are consistent or not is judged. Step 207 is carried out if the data plane resource state of the node and the control plane resource state of the node are consistent, and step 206 is carried out if the data plane resource state of the node and the control plane resource state of the node are not consistent.

Step 206: The data plane resource state of the node and the control plane resource state of the node are synchronized.

In this embodiment, if the data plane resource state of the node and the control plane resource state of the node are not consistent, a subsequent processing may be carried out in three ways as follows.

1. Reporting to the Management Plane of the Node.

The inconsistency is reported to the management plane of the node, and the management plane of the node makes a corresponding processing in accordance with an actual situation, either by carrying out the synchronization processing, or by restarting the network, or in another processing manner.

2. Employing an Automatic Mechanism.

When the states are detected to be inconsistent, the LRM directly carries out a synchronization operation, and the specific action is described below. When it is found that "the control plane state is available, and the data plane state is occupied," a corresponding state of the control plane may be automatically synchronized to be occupied. When it is found that "the control plane state is occupied, and the data plane state is available," the deletion of a connection using the resource is initiated on the control plane, thus synchronizing a corresponding state of the control plane to be available.

3. Triggering a Control Plane State Detection in a Horizontal Direction.

When the data plane and the control plane resource states of the node are detected to be inconsistent, the node may trigger detection so that the node and an adjacent node are consistent in the control plane resource state.

The synchronization is carried out by adjusting the control plane resource state to be consistent with the data plane resource state in this embodiment, but it is understood that, the synchronization may also be carried out by adjusting the data plane resource state to be consistent with the control plane resource state, and the specific process of which is similar to the above and will not be repeated herein.

Step 207: The detection result of the data plane resource state of the node and the control plane resource state of the node is reported to the management plane of the node.

In this embodiment, the detection result is reported to the management plane of the node at all events.

Step 208: The network event state of the node continues to be monitored.

II. The Horizontal Resource State is not Consistent.

Figure 3:
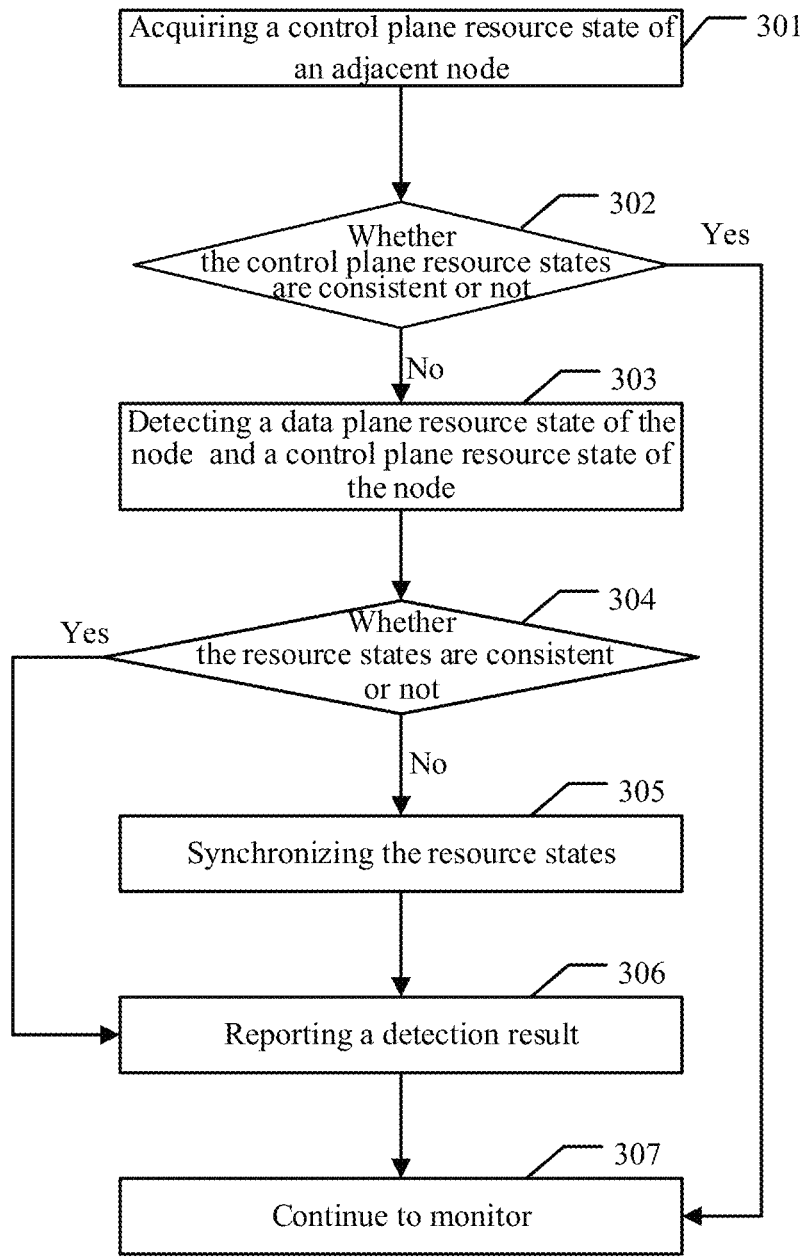
FIG. 3 is a flowchart of a resource state monitoring method according to a second embodiment of the present invention.

Referring to FIG. 3, a resource state monitoring method according to a second embodiment of the present invention includes the following steps.

Step 301: A control plane resource state of an adjacent node is acquired.

In this embodiment, the control plane resource state of an adjacent node in the ASON network topology is acquired, in which the adjacent may be either adjacent in a physical position or adjacent in a logical position. The adjacent in a physical position refers to that two nodes are connected directly by a physical link without any other node between the two nodes. The adjacent in a logical location refers to a forward adjacency (FA) via multiple nodes between two nodes, or the two nodes are connected according to a layer network defined in G805.

Step 302: Whether the control plane resource states of the two nodes are consistent or not is judged. Step 307 is carried out if the control plane resource states of the two nodes are consistent, and step 303 is carried out if the control plane resource states of the two nodes are not consistent.

In this embodiment, whether the states of each corresponding SNP on two adjacent nodes in the control plane are consistent or not is judged to serve as a reference for judging whether the control plane resource states are consistent or not.

Step 303: The data plane resource state of the node and the control plane resource state of the node are detected.

In this embodiment, when the control plane resource states of two adjacent nodes are not consistent, the respective data plane resource state of each node and control plane resource state of each node should be detected.

In this embodiment, the specific detecting process includes that the node requires the LRM to detect the resource state, and the LRM, in cooperation with another control plane entity (e.g., a TAP), checks a data plane resource, detects the cross state of the data plane and the connection state of the control plane, and compares to see whether the resource corresponding to the node is consistent in the control plane and the data plane or not.

Step 304: Whether the data plane resource state of the node and the control plane resource state of the node are consistent or not is judged. Step 306 is carried out if the data plane resource state of the node and the control plane resource state of the node are consistent, and step 305 is carried out if the data plane resource state of the node and the control plane resource state of the node are not consistent.

Step 305: The data plane resource state of the node and the control plane resource state of the node are synchronized.

In this embodiment, if the data plane resource state of the node and the control plane resource state of the node are not consistent, a subsequent processing may be carried out in two ways as follows.

1. Reporting to the Management Plane of the Node.

The inconsistency is reported to the management plane of the node, and the management plane of the node makes a corresponding processing in accordance with an actual situation, either by carrying out the synchronization processing, or by restarting the network, or in another processing manner.

2. Employing an Automatic Mechanism.

When the states are detected to be inconsistent, the LRM directly carries out a synchronization operation, and the specific action is described below. When it is found that "the control plane state is available, and the data plane state is occupied", a corresponding state of the control plane may be automatically synchronized to be occupied. When it is found that "the control plane state is occupied, and the data plane state is available", the deletion of a connection using the resource is initiated on the control plane, thus synchronizing a corresponding state of the control plane to be available.

The synchronization is carried out by adjusting the control plane resource state to be consistent with the data plane resource state in this embodiment, but it is understood that, the synchronization may also be carried out by adjusting the data plane resource state to be consistent with the control plane resource state, and the specific process of which is similar to the above and will not be repeated herein.

Step 306: The detection result of the data plane resource state of the node and the control plane resource state of the node is reported to the management plane of the node.

In this embodiment, the detection result is reported to the management plane of the node at all events.

Step 307: The network event state of the node continues to be monitored.

III. A Predetermined Time Threshold Value is Reached.

Figure 4:
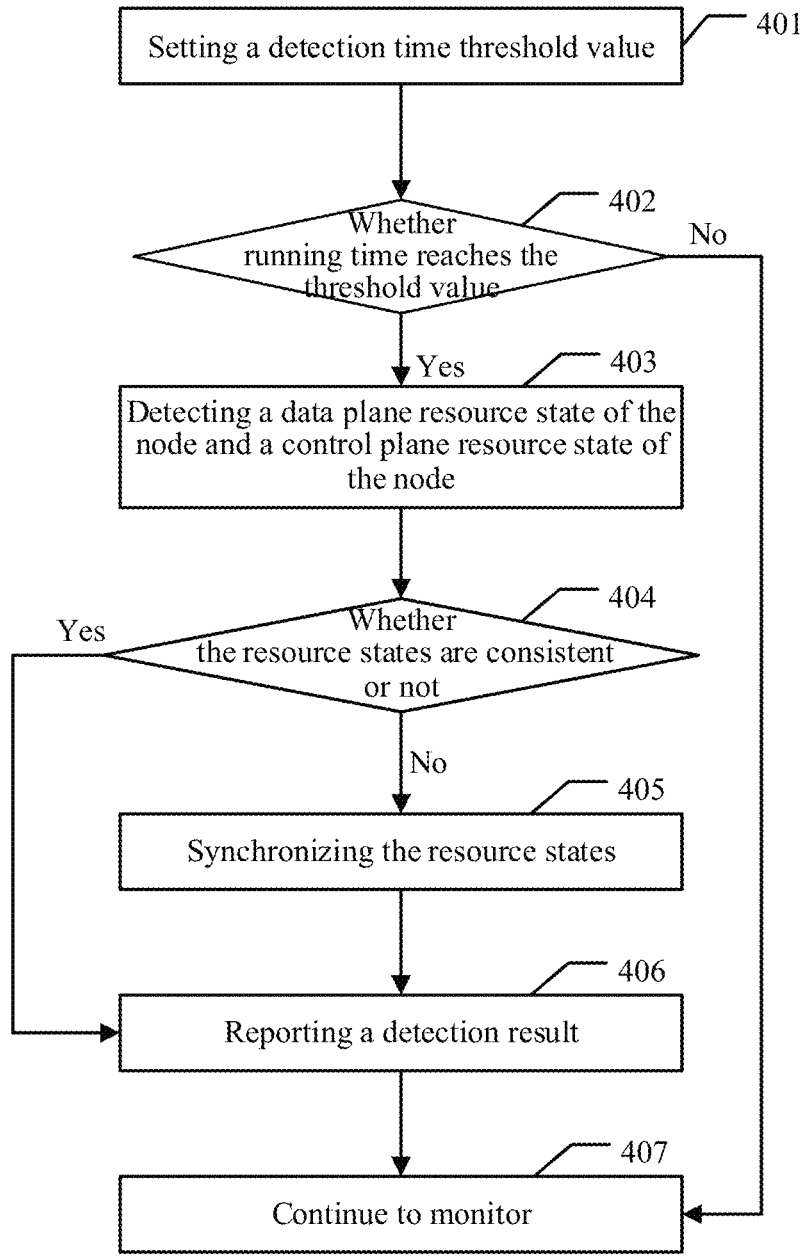
FIG. 4 is a flowchart of a resource state monitoring method according to a third embodiment of the present invention.

Referring to FIG. 4, a resource state monitoring method according to a third embodiment of the present invention includes.

Step 401: A detection time threshold value is set.

In this embodiment, a detection time threshold value is set when or before the ASON network runs, for instructing the LRM to detect the consistency of the control plane resource state of each node and the data plane resource state of each node when the network running time reaches the threshold value. It may be understood that, the detection may be performed in real time or every a period of time circularly.

Step 402: Whether the running time reaches the threshold value is judged.

Step 403 is carried out if the running time reaches the threshold value, and step 407 is carried out if the running time does not reach the threshold value.

Step 403: The data plane resource state of the node and the control plane resource state of the node are detected.

In this embodiment, when the predetermined detection time is reached, the data plane resource state of the node and the control plane resource state of the node should be detected.

In this embodiment, the specific detecting process includes that the node requires the LRM to detect the resource state, and the LRM, in cooperation with another control plane entity (e.g., a TAP), checks the data plane resource, detects the cross state of the data plane and the connection state of the control plane, and compares to see whether the resource corresponding to the node is consistent in the control plane and the data plane or not.

Step 404: Whether the data plane resource state of the node and the control plane resource state of the node are consistent or not is judged. Step 406 is carried out if the data plane resource state of the node and the control plane resource state of the node are consistent, and step 405 is carried out if the data plane resource state of the node and the control plane resource state of the node are not consistent.

Step 405: The data plane resource state of the node and the control plane resource state of the node are synchronized.

In this embodiment, if the data plane resource state of the node and the control plane resource state of the node are not consistent, a subsequent processing may be carried out in three ways as follows.

1. Reporting to the Management Plane of the Node.

The inconsistency is reported to the management plane of the node, and the management plane of the node makes a corresponding processing in accordance with an actual situation, either by carrying out the synchronization processing, or by restarting the network, or in another processing manner.

2. Employing an Automatic Mechanism.

When the states are detected to be inconsistent, the LRM directly carries out a synchronization operation, and the specific action is described below. When it is found that "the control plane state is available, and the data plane state is occupied," a corresponding state of the control plane may be automatically synchronized to be occupied. When it is found that "the control plane state is occupied, and the data plane state is available," the deletion of a connection using the resource is initiated on the control plane, thus synchronizing a corresponding state of the control plane to be available.

3. Triggering Control Plane State Detection in a Horizontal Direction.

When the data plane resource state of the node and the control plane resource state of the node are detected to be inconsistent, the node may trigger consistency detection of the control plane resource state of the adjacent node.

The synchronization is carried out by adjusting the control plane resource state to be consistent with the data plane resource state in this embodiment, but it is understood that, the synchronization may also be carried out by adjusting the data plane resource state to be consistent with the control plane resource state, and the specific process of which is similar to the above and will not be repeated herein.

Step 406: The detection result of the data plane resource state of the node and the control plane resource state of the node is reported to the management plane of the node.

In this embodiment, the detection result is reported to the management plane of the node at all events.

Step 407: The network event state of the node continues to be monitored.

The three conditions for triggering the consistency detection of the control plane resource state of the node and the data plane resource state of the node described above may be selected or combined according to the actual situation, so as to increase the flexibility of the resource state monitoring method in the embodiments of the present invention.

Figure 5:
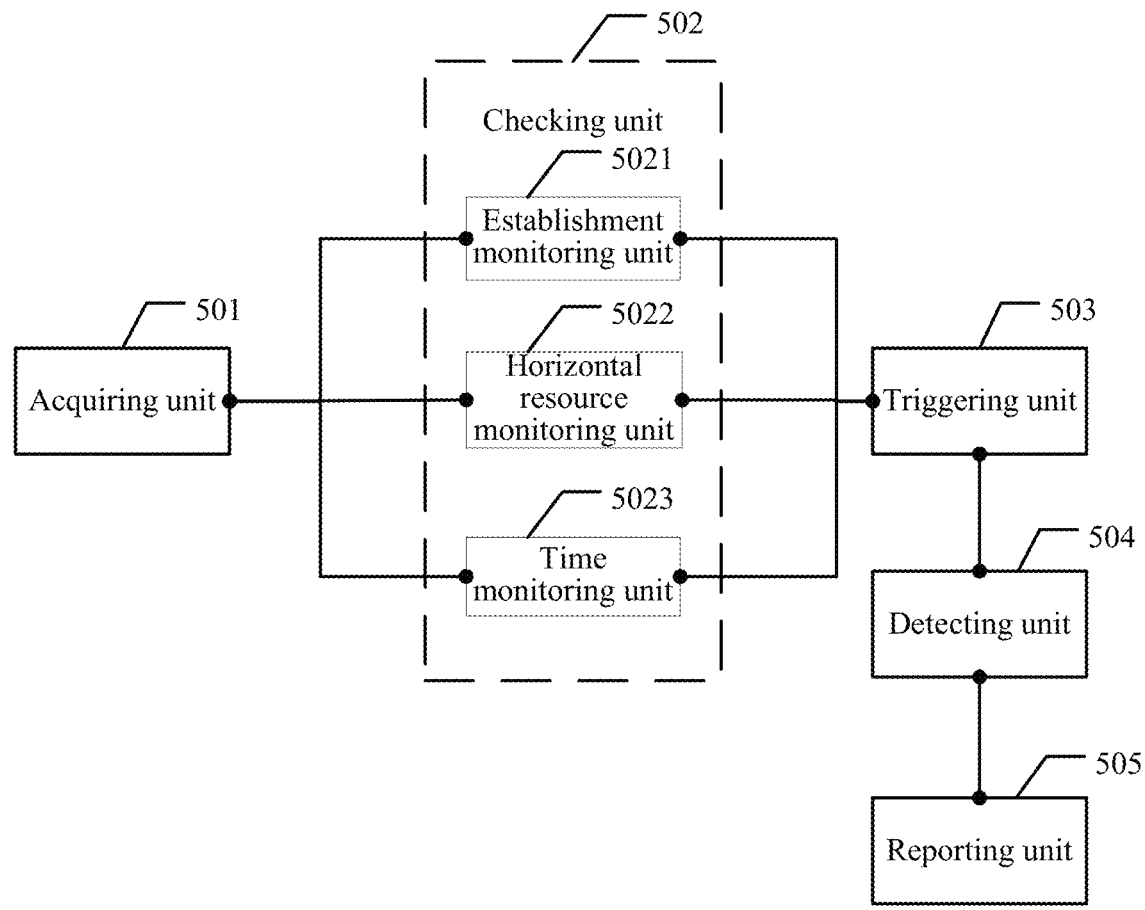
FIG. 5 is a schematic view of a resource state monitoring device according to an embodiment of the present invention.

A resource state monitoring device according to an embodiment of the present invention will be introduced below. Referring to FIG. 5, the resource state monitoring device according to an embodiment of the present invention includes an acquiring unit 501, a checking unit 502, a triggering unit 503, a detecting unit 504, and a reporting unit 505.

The acquiring unit 501 is adapted to acquire network event state information of the node.

The checking unit 502 is adapted to judge whether the network event state information of the node meets a resource state detection triggering condition or not, and send a triggering notification if the network event state information of the node meets the resource state detection triggering condition.

The triggering unit 503 is adapted to trigger detection after receiving the triggering notification of the checking unit 502.

The detecting unit 504 is adapted to detect the data plane resource state of the node and the control plane resource state of the node after receiving the triggering of the triggering unit 503.

The reporting unit 505 is adapted to report a detection result of the detecting unit 504 to a management plane of the node.

In this embodiment, the checking unit 502 includes an establishment monitoring unit 5021 and/or a horizontal resource monitoring unit 5022 and/or a time monitoring unit 5023.

The establishment monitoring unit 5021 is adapted to judge whether a label switching path connection between the first node and the second node is established successfully or not, and send a notification to the triggering unit 503 if a label switching path connection between the first node and the second node is established successfully.

The horizontal resource monitoring unit 5022 is adapted to judge whether the control plane resource states of two adjacent nodes in an automatically switched optical network topology structure are consistent or not, and send a notification to the triggering unit 503 if the control plane resource states of two adjacent nodes in the automatically switched optical network topology structure are consistent.

The time monitoring unit 5023 is adapted to judge whether running time of the automatically switched optical network reaches a detection time threshold value or not, and send a notification to the triggering unit 503 if the running time of the automatically switched optical network reaches the detection time threshold value.

In this embodiment, one or more may be selected from the establishment monitoring unit 5021, the horizontal resource monitoring unit 5022 and the time monitoring unit 5023 according to the actual situation.

Figure 6:
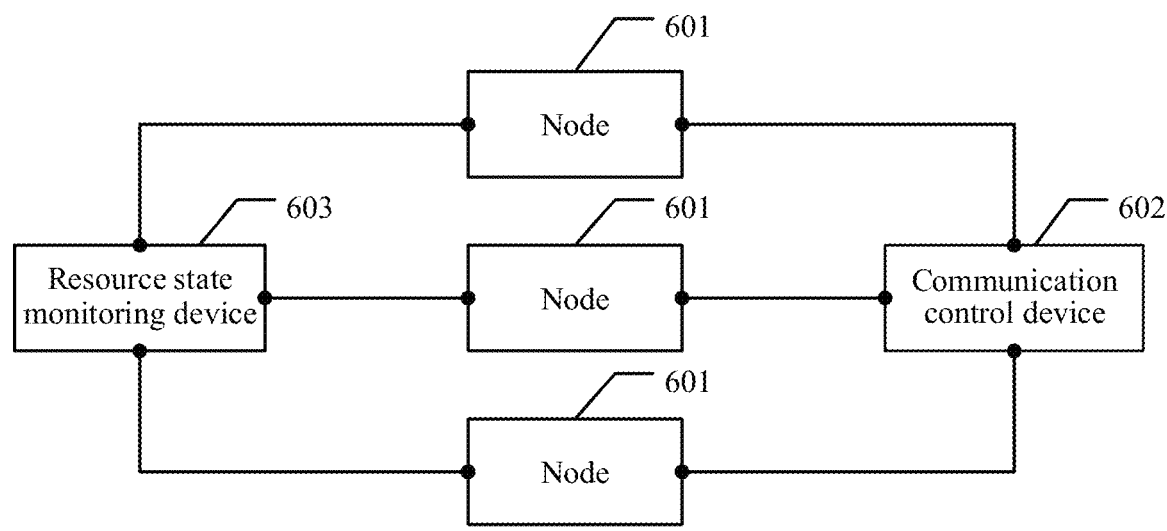
FIG. 6 is a schematic view of a communication network according to an embodiment of the present invention.

A communication network according to an embodiment of the present invention is introduced below. Referring to FIG. 6, the communication network according to an embodiment of the present invention includes several nodes 601 (taking 3 nodes for example in this embodiment), a communication control device 602 and a resource state monitoring device 603.

The node 601 is adapted to communicate in the communication network.

The communication control device 602 is adapted to control each of the nodes 601 to communicate.

The resource state monitoring device 603 is adapted to acquire the network event state information of each of the nodes 601, detect the data plane resource state of each of the nodes 601 and the control plane resource state of each of the nodes 601 when the network event state of each of the nodes 601 is determined to meet the resource state detection triggering condition, and report the detection result to the management plane of each of the nodes 601.

The resource state monitoring device includes an acquiring unit, a checking unit, a triggering unit, a detecting unit and a reporting unit. The functions and actions of the units are the same as those of the units in FIG. 5, and the specific description may be obtained with reference to the above description, and will not be repeated herein.

Those with ordinary skill in the art may appreciate that, all or part of the steps in achieving the above embodiments of the method may be accomplished by instructing related hardware by programs, and the programs may be stored in a computer readable storage medium. The program includes the following steps as executed:

In a running process of an automatically switched optical network, whether the network event state of the node meets the resource state detection triggering condition or not is judged, and the data plane resource state of the node and the control plane resource state of the node are detected if the network event state of the node meets the resource state detection triggering condition.

The aforementioned storage medium may be a read-only memory, a magnetic disk, an optical disc, and so on.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A method for monitoring resource state in a communication network that comprises a plurality of nodes, comprising:
   determining, by a node, whether a label switching path connection, which connects the node with an adjacent node, is established successfully;
   based on a determination that the label switching path connection is not established successfully, determining, by the node, whether a data plane resource state of the node and a control plane resource state of the node are consistent; and
   based on a determination that the data plane resource state of the node and the control plane resource state of the node are inconsistent, reporting, by the node, the inconsistency to a management plane of the node.

2. The method according to claim 1, wherein before determining whether the label switching path connection is established successfully, the method further comprises:
   initiating, by the node, a label switching path connection establishing request to the adjacent node; and
   receiving, by the node, a label switching path connection establishing response from the adjacent node.

3. The method according to claim 1, wherein determining whether the data plane resource state of the node and the control plane resource state of the node are consistent comprises:
   detecting, by the node, cross connection status of a data plane of the node and cross connection status of a control plane of the node.

4. The method according to claim 1, further comprising:
   based on the determination that the data plane resource state of the node and the control plane resource state of the node are inconsistent, synchronizing, by the node, the data plane resource state of the node and the control plane resource state of the node.

5. The method according to claim 4, wherein synchronizing the data plane resource state of the node and the control plane resource state of the node comprises:
   if the control plane resource state of the node is an available state and the data plane resource state of the node is an occupied state, modifying the control plane resource state of the node into the occupied state; and if the control plane resource state of the node is the occupied state and the data plane resource state of the node is the available state, querying cross connection status of a control plane of the node, and deleting a cross connection that occupies a control plane resource of the node, so that the control plane resource state of the node is set to the available state.

6. The method according to claim 1, further comprising:
based on the determination that the data plane resource state of the node and the control plane resource state of the node are inconsistent, determining, by the node, whether the control plane resource state of the node and a control plane resource state of the adjacent node are consistent.

7. A node in a communication network that comprises a plurality of nodes, comprising:
a processor and a memory unit storing instructions for execution by the processor,
wherein the instructions, when executed by the processor, cause the node to perform the following tasks:
determining whether a label switching path connection, which connects the node with an adjacent node, is established successfully;
based on a determination that the label switching path connection is not established successfully, determining whether a data plane resource state of the node and a control plane resource state of the node are consistent; and
based on a determination that the data plane resource state of the node and the control plane resource state of the node are inconsistent, reporting the inconsistency to a management plane of the node.

8. The node according to claim 7, wherein before determining whether the label switching path connection is established successfully, the instructions further cause the node to perform the task of:
initiating a label switching path connection establishing request to the adjacent node; and
receiving a label switching path connection establishing response from the adjacent node.

9. The node according to claim 7, wherein the task of determining whether the data plane resource state of the node and the control plane resource state of the node are consistent comprises:
detecting cross connection status of a data plane of the node and cross connection status of a control plane of the node.

10. The node according to claim 7, wherein the instructions further cause the node to perform the task of:
based on the determination that the data plane resource state of the node and the control plane resource state of the node are inconsistent, synchronizing the data plane resource state of the node and the control plane resource state of the node.

11. The node according to claim 10, wherein the task of synchronizing the data plane resource state of the node and the control plane resource state of the node comprises:
if the control plane resource state of the node is an available state and the data plane resource state of the node is an occupied state, modifying the control plane resource state of the node into the occupied state; and
if the control plane resource state of the node is the occupied state and the data plane resource state of the node is the available state, querying cross connection status of a control plane of the node, and deleting a cross connection that occupies a control plane resource of the node, so that the control plane resource state of the node is set to the available state.

12. The node according to claim 7, wherein the instructions further cause the node to perform the task of:
based on the determination that the data plane resource state of the node and the control plane resource state of the node are inconsistent, determining whether the control plane resource state of the node and a control plane resource state of the adjacent node are consistent.

13. A communication network, comprising a plurality of network nodes, each network node being configured to communicate with one or more other network nodes in the communication network;
wherein at least one of the plurality of network nodes is configured to:
determine whether a label switching path connection, which connects the network node with an adjacent network node, is established successfully;
based on a determination that the label switching path connection is not established successfully, determine whether a data plane resource state of the network node and a control plane resource state of the network node are consistent; and
based on a determination that the data plane resource state of the network node and the control plane resource state of the network node are inconsistent, report the inconsistency to a management plane of the network node.

14. The communication network according to claim 13, wherein before determining whether the label switching path is established successfully, the network node is further configured to:
initiate a label switching path connection establishing request to an adjacent network node; and
receive a label switching path connection establishing response from the adjacent network node.

15. The communication network according to claim 13, wherein the network node is further configured to:
based on the determination that the data plane resource state of the network node and the control plane resource state of the network node are inconsistent, synchronize the data plane resource state of the network node and the control plane resource state of the network node.

16. The communication network according to claim 15, wherein in synchronizing the data plane resource state of the network node and the control plane resource state of the network node, the network node is configured to:
if the control plane resource state of the network node is an available state and the data plane resource state of the network node is an occupied state, modify the control plane resource state of the network node into the occupied state; and
if the control plane resource state of the network node is the occupied state and the data plane resource state of the network node is the available state, query cross connection status of a control plane of the network node, and delete a cross connection that occupies a control plane resource of the network node, so that the control plane resource state of the network node becomes the available state.

17. A non-transitory computer readable medium, storing program instructions for execution by one or more processors of a node in a communication network that comprises a plurality of network nodes, the program instructions comprise:
instructions for determining whether a label switching path connection, which connects the node with an adjacent node, is established successfully;

instructions for determining, when the label switching path connection is not established successfully, whether a data plane resource state of the node and a control plane resource state of the node are consistent;

instructions for reporting the inconsistency to a management plane of the node when the data plane resource state of the node and the control plane resource state of the node are determined to be inconsistent.

18. The non-transitory computer readable medium according to claim 17, wherein the program instructions further comprise:

instructions for initiating a label switching path connection establishing request to an adjacent node; and instructions for receiving a label switching path connection establishing response from the adjacent node.

19. The non-transitory computer readable medium according to claim 17, wherein the program instructions further comprise:

instructions for detecting cross connection status of a data plane of the node and cross connection status of a control plane of the node.

20. The non-transitory computer readable medium according to claim 17, wherein the program instructions further comprise:

instructions for synchronizing the data plane resource state of the node and the control plane resource state of the node when the data plane resource state of the node and the control plane resource state of the node are determined to be inconsistent.

* * * * *